United States Patent
Mansfield et al.

(10) Patent No.: US 7,774,746 B2
(45) Date of Patent: Aug. 10, 2010

(54) GENERATING A FORMAT TRANSLATOR

(75) Inventors: Philip Andrew Mansfield, Vancouver (CA); Michael Robert Levy, Vancouver (CA)

(73) Assignee: Apple, Inc., Cupertino, CA (US)

( * ) Notice: Subject to any disclaimer, the term of this patent is extended or adjusted under 35 U.S.C. 154(b) by 1137 days.

(21) Appl. No.: 11/407,559

(22) Filed: Apr. 19, 2006

(65) Prior Publication Data
US 2007/0260571 A1    Nov. 8, 2007

(51) Int. Cl.
*G06F 9/44* (2006.01)

(52) U.S. Cl. .................. 717/106; 717/108; 717/116; 717/114; 717/136; 717/137; 717/140; 704/2; 704/203; 715/235; 715/236; 715/237; 715/239

(58) Field of Classification Search .............. 717/106, 717/108, 116, 114, 136, 137, 140; 704/2, 704/257, 203, 277, 221; 715/235, 236, 237, 715/239
See application file for complete search history.

(56) References Cited

U.S. PATENT DOCUMENTS

| | | | | |
|---|---|---|---|---|
| 5,586,330 | A * | 12/1996 | Knudsen et al. | 717/136 |
| 6,031,993 | A * | 2/2000 | Andrews et al. | 717/143 |
| 6,233,545 | B1 * | 5/2001 | Datig | 704/2 |
| 6,345,244 | B1 * | 2/2002 | Clark | 704/2 |
| 6,772,413 | B2 * | 8/2004 | Kuznetsov | 717/136 |
| 7,406,682 | B2 * | 7/2008 | Todd et al. | 717/137 |
| 7,451,432 | B2 * | 11/2008 | Shukla et al. | 717/106 |
| 7,581,170 | B2 * | 8/2009 | Baumgartner et al. | 715/234 |
| 7,590,644 | B2 * | 9/2009 | Matsakis et al. | 707/101 |
| 2004/0015889 | A1 * | 1/2004 | Todd et al. | 717/137 |
| 2005/0022115 | A1 * | 1/2005 | Baumgartner et al. | 715/513 |
| 2005/0154550 | A1 * | 7/2005 | Singh et al. | 702/108 |
| 2005/0273772 | A1 * | 12/2005 | Matsakis et al. | 717/136 |
| 2006/0184922 | A1 * | 8/2006 | Vera | 717/136 |

OTHER PUBLICATIONS

Title: Requirements for XML document database systems, Publisher: ACM, author: Airi Salminen et al, dated: Nov. 2001.*
Title: "An XML query engine for network-bound data", publisher: ACM, author: Zachary G. Iyes et al, dated: Dec. 2002.*
Title: "Composing XSL Transformations with XML publishing views", Publisher: ACM, author: Chengkai Li et al, dated: Jun. 2003.*
Dr. Philip Andrew Mansfield, *How to Make a File Format Translator Using XML*, XML 2002 Conference Paper, Dec. 2002, Baltimore Convention Center, Baltimore, Maryland, U.S.A.
Dr. Philip Andrew Mansfield, *Common Graphical Object Models and How to Translate Them to SVG*, SVG Open Developers Conference Paper, Jul. 2002, ETH Hoenggerberg Campus, Zurich, Switzerland.

* cited by examiner

*Primary Examiner*—Chameli C Das
(74) *Attorney, Agent, or Firm*—Van Pelt, Yi & James LLP

(57) ABSTRACT

Generating code is disclosed. A specification of one or more translation patterns is received. The one or more translation patterns are used to generate at least a portion of code associated with a translator. Using the one or more translation patterns to generate at least a portion of code associated with the translator results in the translator being configured to create a target object model. Creating the target object model includes populating one or more elements of the target object model in a processing order at least in part associated with an order of elements in the one or more translation patterns.

47 Claims, 7 Drawing Sheets

GENERATING A FORMAT TRANSLATOR

BACKGROUND OF THE INVENTION

Often electronic content data do not consistently adhere to one standard on format, organization, and use in consistent software. For example, each individual content data creator may choose to save electronic content data in various formats including a variety of text formats, document formats, spread sheet formats, presentation formats, visual graphic formats (e.g. chart, graph, map, drawing, image formats), audio formats, multimedia (e.g. video formats) formats, and database formats. This heterogeneous nature of the electronic content data can pose challenges when the various content need to be converted to a different format. Existing translation solutions typically require that heterogeneous content be converted into a common format. Translation from format A to format B is done in two steps: an import from format A to the common format followed by an export from the common format to format B. This allows all possible mappings between N number of formats with 2N number of converters rather than $N^2$-N number of converters that would be needed without a common format. However, this common format method is inefficient, requiring two conversions steps rather than one. Many standard tools for conversion to the common format operate at inconsistent semantic levels, or encode an inappropriate semantic level, potentially causing information needed to perform desired content management and/or electronic publishing functions, for example, to be lost. As new file formats are created, the current solutions are difficult to adapt to rapidly advancing software technology. Therefore, there exists a need for a better way to convert electronic content.

BRIEF DESCRIPTION OF THE DRAWINGS

Various embodiments of the invention are disclosed in the following detailed description and the accompanying drawings.

DETAILED DESCRIPTION

Figure 1:
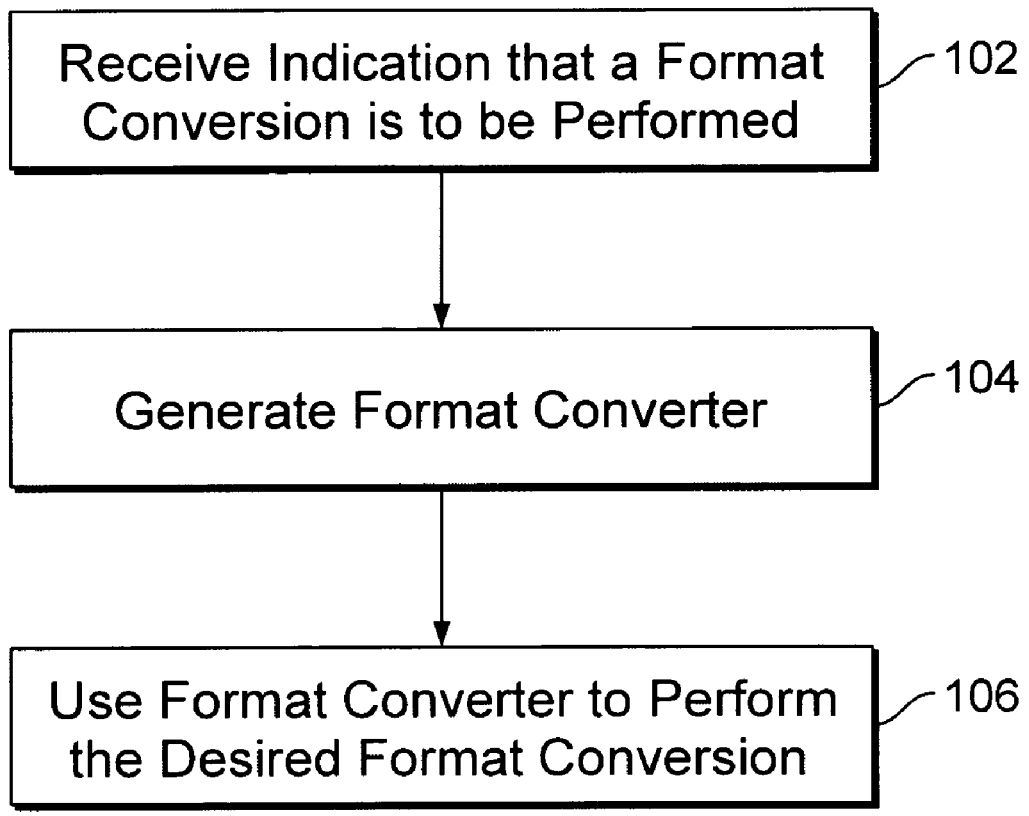
FIG. 1 is a flow chart illustrating an embodiment of a process for performing a desired format conversion.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Specifying a format translation pattern and providing a mechanism for automatically generating translator code based at least in part on a collection of one or more such patterns is disclosed. In some embodiments, the format translation pattern includes a way to represent one or more sets of similar features from different source content formats. In some embodiments, the format translation pattern represents a common way of translating data structures without an assumption that those data structures represent similar features. The pattern includes a parameterization/template for representation of the features as well as representation of the translations between corresponding features. In some embodiments, a meta-language such as XML (Extensible Markup Language) is used to represent the features and/or the translation parameterization. In some embodiments, a code generator takes a parameterized description of a feature of one or more content formats as input and outputs code that translates/implements that feature. In some embodiments, the pattern is one of a plurality of patterns.

As used herein, "format" is defined as any information representation or schema. This may include schemas for streams, database tables, object models, trees, graphs and/or other base data structures. A "translator" between formats is defined as any process that takes information in a source format as input and produces corresponding information in another target format as output. Parsers, mappers and serializers are regarded as instances of translators, and are defined as follows: A "parser" translates from a stream-based format into an object model, a "mapper" converts between object models, and a "serializer" translates from an object model to a stream-based format. In some embodiments, translators can be connected in sequence to make other translators. For example a stream to stream file format translator is created by connecting a parser with any number of successive mappers connected to a serializer.

In some embodiments, the steps to create content conversion software include (i) analysis of the source content format, (ii) creation of a parser, (iii) mapping analysis, (iv) creation of one or more mappers, and (v) implementation of a serializer to the target format. For example, in creating the parser, a suitable collection of translation patterns is selected, and their parameters are filled in using a language developed for the purpose of describing translator instances. The language includes constructs to specify how to query binary streams, applicable to binary source files, as well as other categories of source format such as text or XML. A parser-generator reads in this translator specification, and creates source code for a parser. That parser is compiled to object code. By applying the parser to a source content, an in-memory tree representation of the source content is created. This tree can be shown to a software developer with a tree view in an IDE (Integrated Development Environment) or serialized, for example, as XML for purposes of testing and further developing a parser. In some embodiments, a rapid file format analysis tool that allows a user to discover the source format schema is used in an iterative process: at each step a single modification to the translator specification is suggested by the user, a new parser is generated, a series of test files are parsed, and the results are shown in a tree view or dumped as XML for inspection. The source and target of a mapper are both object models that can be similarly represented as trees in an IDE or as XML, and it is possible to create a rapid mapping analysis tool that generates the mapper translator. Specifying a mapper also involves choosing a suitable collection of translation patterns and filling them in. The Queries used by a mapper are queries into an object model. If XML or another common meta-language is used to represent both source and target of the mapper, then mappers can be rapidly prototyped as translations of that meta-language. For example, XSLT (Extensible Stylesheet Language Transformations) can be used to prototype mappers when the source and target format are represented as XML.

FIG. 1 is a flow chart illustrating an embodiment of a process for performing a desired format conversion. At 102, an indication is received that a format conversion is to be performed. In some embodiments, the indication includes a specification of source content, output format, and/or a desired process associated with the source content. For example, the indication is associated with a desire for a source content to be opened, saved, converted, exported, copied, extracted, edited, re-purposed, re-styled, searched, combined, transformed, rendered or otherwise processed. In some embodiments, the indication is received via a user interface, such as an indication associated with a file icon/identifier, a menu item, a toolbar item, a dialog window item, and/or a text input. In some embodiments, the output format of the desired format conversion is automatically determined based at least in part on the format of the source content and/or desired processing associated with the source content.

At 104, a format converter is generated. In some embodiments, generating the format converter includes generating and connecting together one or more of the following: a parser translator, a mapper translator, and a serializer translator. In some embodiments, serialization is not performed by a separate translator, but by serialization methods on the target objects of the mapper translator. In some embodiments, one or more of the translators are specified using a common language, such as an XML grammar designed to describe translator components and how they are connected together. For example, data is communicated between translators using queries on intermediate object models. These intermediate object models can be described using a common meta-language such as XML, and the queries can be described using a common language such as XPath. In some embodiments, one or more of the translators comprises a previously generated translator and/or a component of another format converter. In some embodiments, an input of at least one of the translators is the source content. At 106, the format converter is used to perform the desired format conversion. In some embodiments, more than one format converter is used to perform the desired format conversion. In some embodiments, output of the desired format conversion is at least in part used in performing a desired processing. In some embodiments, the format of the output is associated with an open standard and can be used to style, view, search, augment, edit or otherwise process the output. For example, in some embodiments the output is in a SVG (Scalable Vector Graphics) format.

Figure 2:
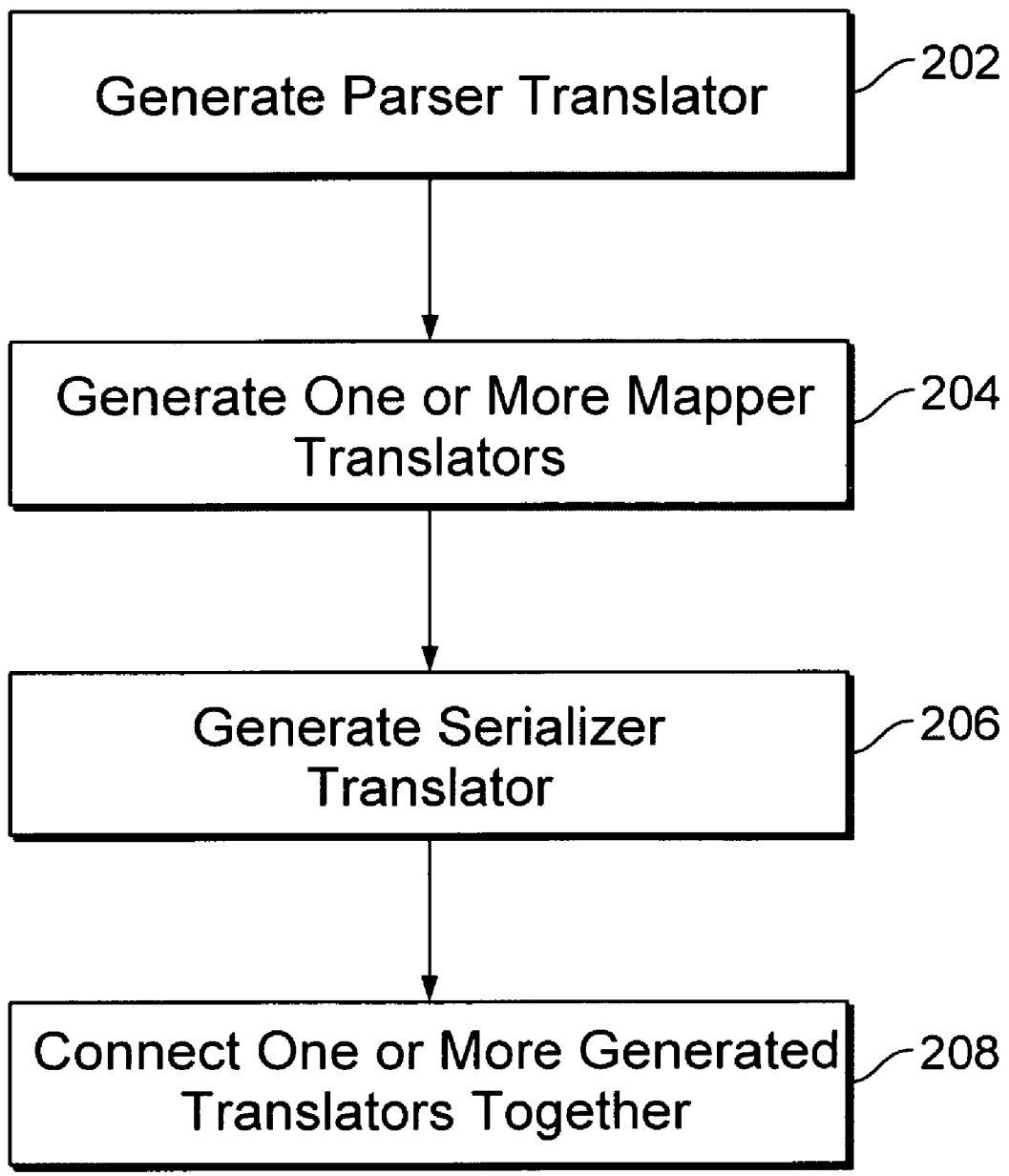
FIG. 2 is a flow chart illustrating an embodiment of a process for generating one or more translators.

FIG. 2 is a flow chart illustrating an embodiment of a process for generating one or more translators. In some embodiments, the process of FIG. 2 is included in 104 of FIG. 1. At 202, a parser translator is generated. In some embodiments, the parser translator is associated with generating an object model of a source content stream. For example, serialized source content is translated to an XML encoded object model of the source content. In some embodiments, the translator is at least in part generated using a specification associated with how to interpret one or more patterns in the source content. The parameterization/specification in some embodiments is defined using a meta-language such as XML in accordance with a schema for defining translation patterns. For example, one or more translation patterns are at least in part used to generate code for compilation/interpretation as the parser translator. In some embodiments, the translation patterns are used to generate the object model. In various embodiments, this object model is the pattern object model. In some embodiments, the parser translator is specified by choosing an appropriate collection of translation patterns, specifying references between translation patterns, and filling in each parameter of each translation pattern with a "function-query-constant-tree", wherein the tree includes a hierarchically organized information including: one or more source content data items (constant), one or more ways of obtaining data associated with the source content (query), and one or more ways of processing data associated with the source content (function).

At 204, one or more mapper translators are generated. In some embodiments, a mapper translator translates at least a portion of content in one object model to another object model. In some embodiments, by using a common API (Application Programming Interface) to access the object models and/or using a common query language together with query compilers that turn this into to source code to accesses disparate APIs, translator re-use is maximized. In some embodiments, generating the mapper translator includes using a parameterization/specification associated with how to interpret one or more translation patterns to generate code for compilation/interpretation as the mapper translator. At 206, a serializer translator is generated. In some embodiments, the serializer translator translates an object model of content to a stream-based format, such as a format associated with a saved file. For example, in some embodiments an in-memory representation of converted content is translated to a format associated with a file on a storage media. In some embodiments, generating the serializer translator includes using a parameterization/specification associated with how to interpret one or more translation patterns to generate code for compilation/interpretation as the serializer translator. At 208, one or more of the generated translators are connected together. In some embodiments, connecting two translators together includes ensuring that they have been specified in such a way as to act on the same intermediate object models, and linking all the code fragments that were generated from their individual pattern instances. By connecting the translators together, a format converter is generated. In some embodiments, the connections between the translators are optimized to create an efficient converter.

In some embodiments, one or more translators are generated in parallel. For example, generation of a translator is dependent on data associated with another translator, and the dependent data is exchanged as the translators are generated. In some embodiments, generation of one or more of the parser translator, the mapper translator, and the serializer translator is optional. For example, when importing/opening a file, the serializer translator is not generated, and when exporting/saving content already in memory, a parser translator is not generated. In some embodiments, one or more pre-generated translators are used, e.g., if available and applicable.

Figure 3:
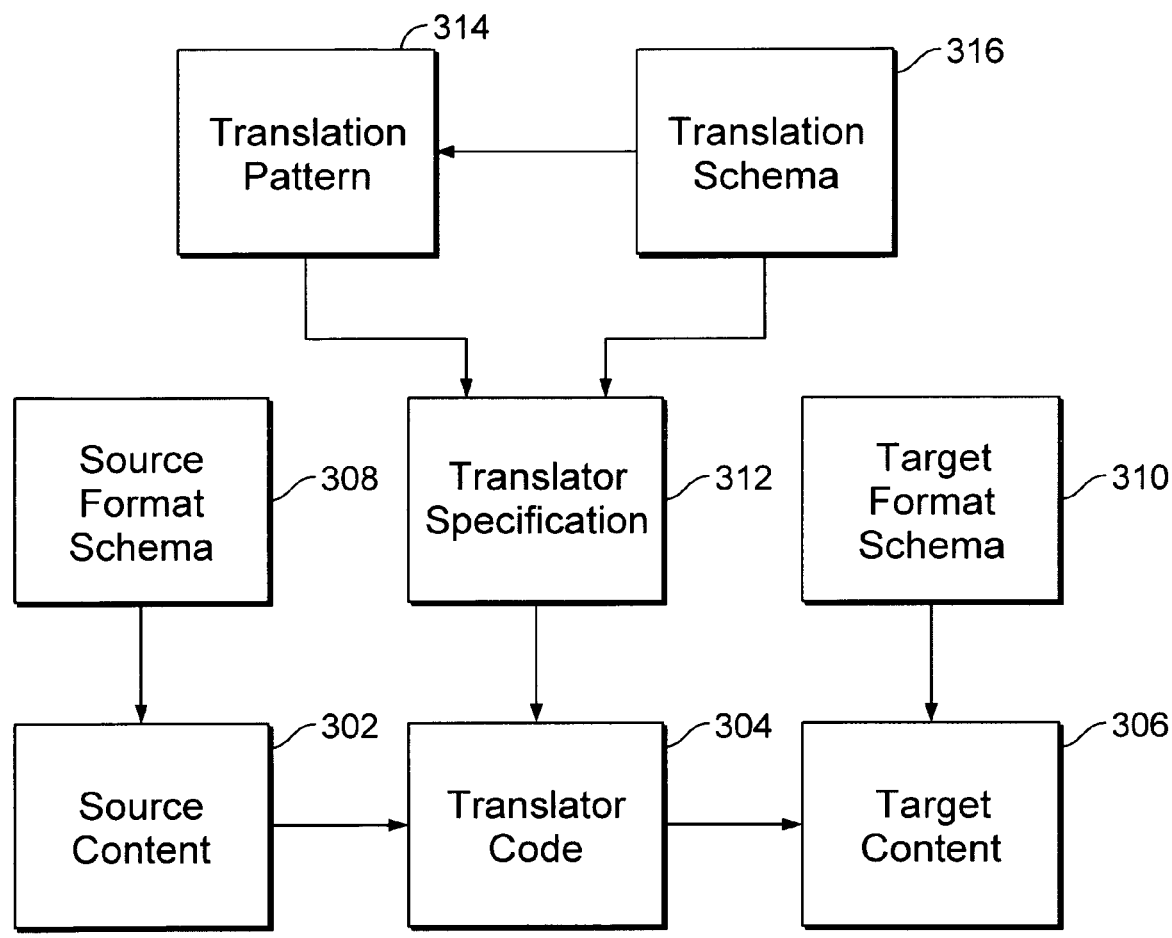
FIG. 3 is a diagram illustrating an embodiment of a process for generating a translator code fragment from a translation pattern, such that the code fragments can collectively be used to convert content from a source format to a target format.

FIG. 3 is a diagram illustrating an embodiment of a process for generating a translator code fragment from a translation pattern, such that the code fragments can collectively be used to convert content from a source format to a target format. In some embodiments, the diagram of FIG. 3 is associated with generating a parser translator, a mapper translator, and/or a serializer translator. In some embodiments, the diagram of FIG. 3 is associated with 202, 204, and/or 206 of FIG. 2. Source content 302 is converted using translator code 304 to produce target content 306. Source content 302 conforms to source format schema 308. Target content 306 conforms to target format schema 310. Translation pattern 314 and translator specification 312 conform to translation schema 316. Translator specification 312 is an instance of translation pattern 314. Translator specification 312 is used at least in part to generate translator code 304 that can be compiled/interpreted along with other generated and manually produced code fragments to produce a format converter. In some embodiments, for each source format and each way of mapping it, there exists a unique translator, formed as a unique set of instances of translation patterns. In some embodiments, translation pattern 314 is one of a library of such patterns that represent recurring translation themes and are re-used to generate code for multiple translators, each of which may be applied to different source formats. In some embodiments, translation schema 316 defines the format and/or how to interpret translation pattern 314.

Figure 4:
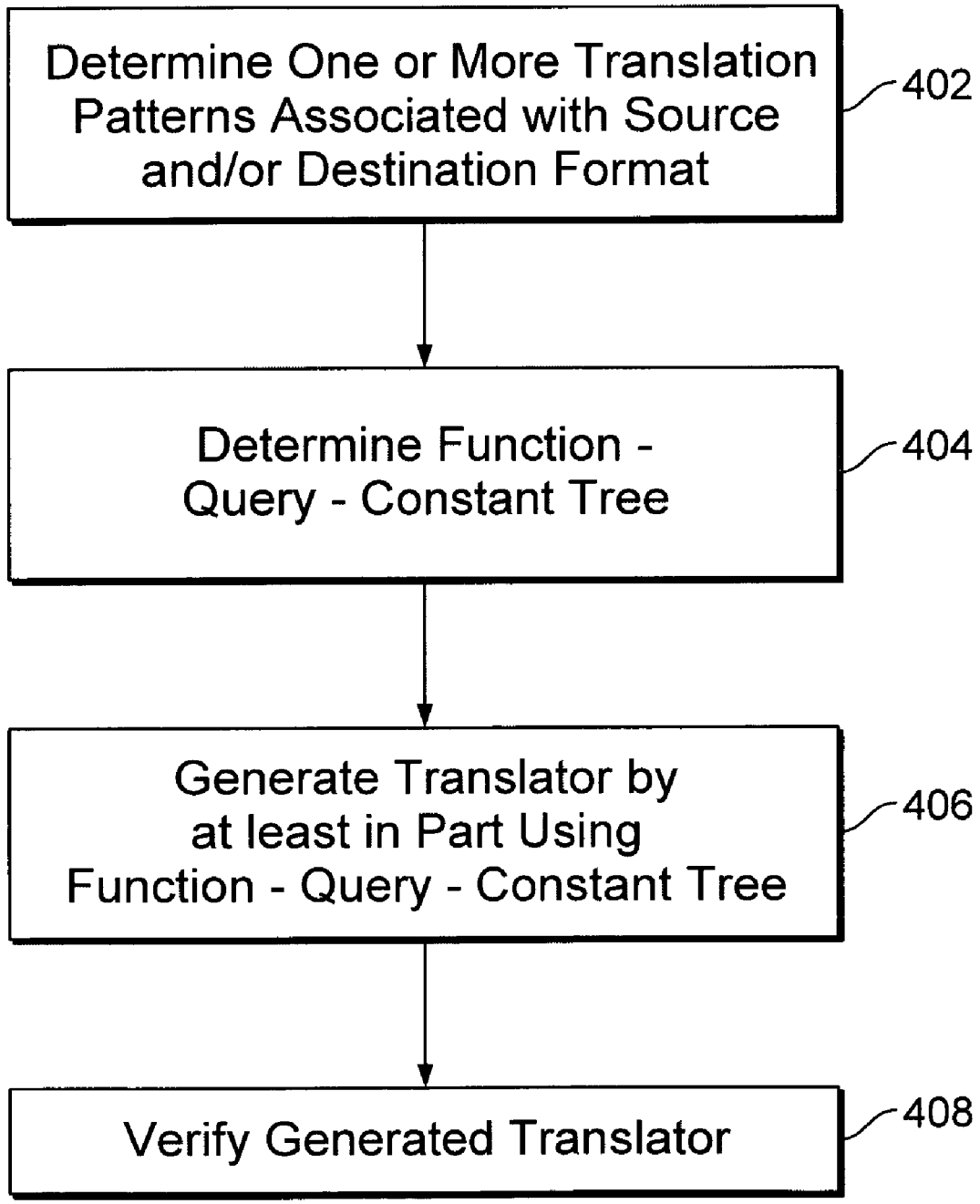
FIG. 4 is a flow chart illustrating an embodiment of a process for generating and verifying a translator.

FIG. 4 is a flow chart illustrating an embodiment of a process for generating and verifying a translator. In some embodiments, the process of FIG. 4 is included in 104 of FIG. 1 and/or 202, 204, and/or 206 of FIG. 2. In some embodiments, the process of FIG. 4 is associated with generating translator code 304. At 402, one or more translation patterns associated with source and/or or target format is determined. In some embodiments, translation patterns are specific to the target format but independent of the source format. Such translation patterns are associated with commonalities among one or more translations to the target format. In some embodiments, the translation patterns are found by classifying data structures in the target format and each classification of data structures is associated with a corresponding translation pattern. By using the approach described above, the task of format conversion to a target format can be subdivided into a number of separate translation patterns. For each identified pattern, one or more of the following is created: a pattern object model for the information represented in the pattern; a code generator that turns instances of the object model into translator code which, in turn, outputs the target structure; and a schema for the target structure. In some embodiments, elements of the source content in a translation pattern are used in one or more of the following ways: as objects that participate in translation patterns, as input parameters of objects, and as objects that participate in another translation pattern. In some embodiments, format conversion requires an object model associated with the source format and an object model associated with the target format. In some embodiments, the object models improve efficiency by setting up optimal addressing mechanisms for data that is stored and re-used during the mapping process. In some embodiments, the object model stores one or more pointers or references to data rather than the data itself.

At 404, a function-query-constant tree is determined. Specifying an instance of a translator pattern requires a combination of three basic operations: placing data, obtaining data, and manipulating data. For example, an XML tag in a translation pattern for specifying each of these operations includes in some embodiments: "<const>" tag indicating constants for placing data, "<query>" tag indicating queries for obtaining data from the source content; and "<func>" identifying functions for manipulating data. Each individual parameter in the object model for a translation pattern can be filled in with a constant, a query, or a function. Within a function, arguments can be filled in with a constant, a query or another function. In some embodiments, by filling in the translation patterns, a function-query-constant tree is generated with interior nodes that are functions and leaf nodes that are queries or constants. In some embodiments, the translation pattern is associated with a translation schema. The following is an example of the translation schema. The "translation.xsd" XML schema below encodes a parameterized object model for translation patterns as well as the function-query-constant trees that are used to specify instances.

```
<?xml version="1.0" encoding="UTF-8"?>
<schema targetNamespace="http://www.schemasoft.com/schema/
translation.xsd"
  xmlns="http://www.w3.org/2001/XMLSchema"
  xmlns:trans="http://www.schemasoft.com/schema/translation.xsd"
  elementFormDefault="qualified" attributeFormDefault="unqualified">
  <element name="translation">
    <annotation>
      <documentation>For translation patterns and instances
      </documentation>
    </annotation>
    <complexType>
      <sequence>
        <element name="object" type="trans:objectType"/>
      </sequence>
      <attribute name="uri" type="anyURI" use="required"/>
      <attribute name="version" type="decimal"/>
    </complexType>
  </element>
  <complexType name="objectType">
    <choice minOccurs="0" maxOccurs="unbounded">
      <element name="object" type="trans:objectType"/>
      <element name="param" type="trans:paramType"/>
    </choice>
    <attribute name="name" type="Name"/>
    <attribute name="id" type="ID"/>
    <attribute name="href" type="anyURI"/>
  </complexType>
  <complexType name="paramType" mixed="true">
    <choice minOccurs="0">
      <element name="func" type="trans:funcType"/>
      <element name="query" type="trans:queryType"/>
      <element name="const" type="trans:constType"/>
    </choice>
    <attribute name="name" type="Name"/>
    <attribute name="type" type="string"/>
    <attribute name="default" type="string"/>
  </complexType>
  <complexType name="funcType">
    <choice minOccurs="0" maxOccurs="unbounded">
      <element name="func" type="trans:funcType"/>
      <element name="query" type="trans:queryType"/>
      <element name="const" type="trans:constType"/>
    </choice>
    <attribute name="ns" type="anyURI"/>
    <attribute name="class" type="Name"/>
    <attribute name="xpath" type="string"/>
    <attribute name="name" type="Name" use="required"/>
    <attribute name="type" type="string"/>
  </complexType>
  <complexType name="queryType">
    <annotation>
```

-continued

```
    <documentation>Subclassed for various query sources</documentation>
   </annotation>
   <simpleContent>
    <extension base="string">
     <attribute name="type" type="string"/>
    </extension>
   </simpleContent>
  </complexType>
  <complexType name="constType">
   <attribute name="type" type="string"/>
   <attribute name="value" type="string" use="required"/>
  </complexType>
  <complexType name="xpathQueryType">
   <simpleContent>
    <extension base="trans:queryType">
     <attribute name="xpath" type="string" use="required"/>
    </extension>
   </simpleContent>
  </complexType>
  <complexType name="sqlQueryType">
   <simpleContent>
    <extension base="trans:queryType"/>
   </simpleContent>
  </complexType>
  <complexType name="regExpQueryType">
   <simpleContent>
    <extension base="trans:queryType">
     <attribute name="regExp" type="string" use="required"/>
     <attribute name="encoding" type="string" default="UTF-8"/>
     <attribute name="index" type="nonNegativeInteger" default="1"/>
     <attribute name="length" type="trans:nonNegativeCountable"
        default="unbounded"/>
     <attribute name="overlap" type="boolean" default="true"/>
    </extension>
   </simpleContent>
  </complexType>
  <complexType name="binQueryType">
   <complexContent>
    <extension base="trans:queryType">
     <sequence>
      <element name="func" type="trans:funcType" minOccurs="0"/>
      <element name="range" type="trans:rangeType" minOccurs="0"
         maxOccurs="unbounded"/>
     </sequence>
     <attribute name="endian" default="little">
      <simpleType>
       <restriction base="NMTOKEN">
        <enumeration value="little"/>
        <enumeration value="big"/>
       </restriction>
      </simpleType>
     </attribute>
    </extension>
   </complexContent>
  </complexType>
  <complexType name="rangeType">
   <sequence>
    <element name="skip" type="trans:delimiterType" minOccurs="0"
       maxOccurs="unbounded"/>
    <element name="start" type="trans:delimiterType"/>
    <element name="skip" type="trans:delimiterType" minOccurs="0"
       maxOccurs="unbounded"/>
    <element name="end" type="trans:delimiterType"/>
    <element name="range" type="trans:rangeType" minOccurs="0"
       maxOccurs="unbounded"/>
    <element name="count" type="trans:inputType" minOccurs="0"/>
   </sequence>
  </complexType>
  <complexType name="delimiterType">
   <sequence>
    <element name="offset" type="trans:inputType" minOccurs="0"/>
    <element name="repeat" type="trans:inputType" minOccurs="0"/>
   </sequence>
   <attribute name="align" type="positiveInteger" default="1"/>
   <attribute name="bitsPerUnit" type="positiveInteger" default="8"/>
   <attribute name="ref" default="relative">
    <simpleType>
     <restriction base="NMTOKEN">
      <enumeration value="relative"/>
      <enumeration value="current"/>
      <enumeration value="absolute"/>
     </restriction>
    </simpleType>
   </attribute>
  </complexType>
  <complexType name="compareDelimiterType">
   <complexContent>
    <extension base="trans:delimiterType">
     <sequence>
      <element name="compareTo" type="trans:inputType"/>
     </sequence>
     <attribute name="size" type="positiveInteger" default="1"/>
     <attribute name="interval" type="positiveInteger"/>
     <attribute name="relation" default="equal">
      <simpleType>
       <restriction base="NMTOKEN">
        <enumeration value="less"/>
        <enumeration value="lessOrEqual"/>
        <enumeration value="equal"/>
        <enumeration value="greaterOrEqual"/>
        <enumeration value="greater"/>
        <enumeration value="notEqual"/>
       </restriction>
      </simpleType>
     </attribute>
    </extension>
   </complexContent>
  </complexType>
  <complexType name="regExpDelimiterType">
   <complexContent>
    <extension base="trans:delimiterType">
     <attribute name="regExp" type="string" use="required"/>
     <attribute name="encoding" type="string" default="UTF-8"/>
     <attribute name="matchedChar" default="first">
      <simpleType>
       <restriction base="NMTOKEN">
        <enumeration value="first"/>
        <enumeration value="last"/>
       </restriction>
      </simpleType>
     </attribute>
    </extension>
   </complexContent>
  </complexType>
  <complexType name="inputType" mixed="true">
   <choice minOccurs="0">
    <element name="func" type="trans:funcType"/>
    <element name="query" type="trans:queryType"/>
    <element name="const" type="trans:constType"/>
   </choice>
   <attribute name="type" type="string"/>
  </complexType>
  <simpleType name="nonNegativeCountable">
   <union>
    <simpleType>
     <restriction base="nonNegativeInteger"/>
    </simpleType>
    <simpleType>
     <restriction base="string">
      <enumeration value="unbounded"/>
     </restriction>
    </simpleType>
   </union>
  </simpleType>
 </schema>
```

In some embodiments, the translation pattern objects (represented by "<object>" elements) exist at design time and contain the parameter inputs to the code generators. The target objects exist at run time only, include member functions that can be called using "<func>" elements, and are created by the generated code. In various embodiments, element types used above in "translation.xsd" are as explained below.

| | |
|---|---|
| <translation> | The <translation> element is outermost, with a uri attribute to uniquely identify the pattern and a version attribute to keep track of ongoing updates to the pattern. |
| <object> | The pattern's object model is written as a hierarchy of <object> elements, each can have a name attribute to identify its class, as well as an href attribute to point to an external definition of the object, or an id attribute to allow others to point to this object definition. |
| <param> | The object model is parameterized with <param> elements with name attribute to identify the parameter, type attribute to indicate data type expected for the parameter, and default attribute giving the value used when the parameter is not filled in. Parameters are filled in by providing a <func>, <query> or <const> child element. |
| <func> | Input data is manipulated with functions represented by <func> elements. These are identified by their name attribute, and the return type is as specified by their type attribute. Functions that are methods of objects in the translator's output object tree are indicated by providing an xpath attribute to point to the object, or a class attribute to identify the class of the object. In the latter case, the first argument of the function is the "this" argument that determines which object of the given class is being referenced, unless the function is static, in which case no "this" argument is needed. The ns attribute can be used to identify function libraries or packages with a namespace. When referring to member functions of objects generated by another translation pattern instance, this must match the uri attribute of the corresponding <translation> element.<br>Each of the child elements of a <func> element describes how to fill one of the function inputs. The allowed child elements are the same as those used to fill in parameters: <func>, <query> or <const>. Queries can return collections, such as the node sets returned by XPaths. Collections are interpreted as arrays for purposes of function input. When an array of objects is specified for an input not typed as an array, the function is to be applied to each element of the array individually, and an array of results is to be returned. This can lead to arrays of arrays being returned if more than one argument is specified in this manner. The interpretations described here are enforced by default in the code generators for translation patterns. |
| <query> | Each <query> element specifies how to get a unit of information from the source file, and its type attribute indicates the data type of the information once gotten. This attribute is not to be confused with the xsi:type attribute for indicating the inherited type of <query> element used in instance documents. There are four inherited types of <query> element defined in translation.xsd, all by extension of the base queryType. These are: xpathQueryType for XPath queries on XML document sources, sqlQueryType for SQL queries on database sources, regExpQueryType for regular expression queries on text file sources, and binQueryType for queries on binary source files. |
| <const> | Constants are set with the <const> element by providing the data type in its type attribute and the data value in its value attribute. |

At 406, a translator is generated at least in part by using the function-query-constant tree. In some embodiments, the tree is used at least in part to generate code that can be compiled/interpreted to generate a translator.

In some embodiments, a parser is generated in 406. For example, an instantiated parser is associated with a tree of target objects under class membership. The children of a given object are among its member objects. The object model is defined by associating together a collection of parsing patterns. In some embodiments, the association includes setting "href" attributes on "<object>" elements of files adhering to the "translation.xsd" schema. Each target object implements a parse interface, including a method to read itself. The code to do this is determined by the function-query-constant trees assigned to the pattern object model's parameters. A binary file format parser uses the "binQueryType" of "<query>" element to specify file access. For example, the "binQueryType" content model includes "<range>" elements used to specify byte ranges. "<range>" elements can contain other "<range>" elements, so that the final data query can be arrived at via a process of refinement in which ranges, sub-ranges, and sub-sub-ranges identified. The "binQueryType" content model allows an optional "<func>" element. If present, this means that the query is to be performed on the stream output of the function identified by the "<func>" element rather than on the source file stream. That function can be a member function of a parser target object, and its inputs can be specified as file stream read operations and/or further function calls. The implications for data flow are that parts of the file stream can be processed in stages, each intermediate stage being another stream. The formalism and code generator are capable of handling these intermediate streams in the same manner as the original file stream. This is useful when the source format has any of the following features: structured storage, such as OLE DocFile or RIFF (Resource Interchange File Format); compression, such as Huffman, Lempel-Ziv-Welch, arithmetic coding, run-length coding, discrete cosine transform, or fractal; encoding, such as Base64, UUencode, BinHex, Quoted-Printable or yEnc Encryption, such as RSA, Diffie-Hellman, DES, Blowfish, IDEA, or RC4; embedded formats; and/or proprietary obfuscation algorithms.

In some embodiments, binary queries can access arrays of data just as XPath queries can. In particular, multiple sibling "<range>" elements are interpreted as an array of values. Furthermore, an optional "<count>" child of the "<range>" element can be used to access repetitive byte sequences as arrays. This "<count>" element specifies the maximum number of times to repeat the range specification; the end of the stream or sub-stream might be reached first. Often, the "<count>" data is something that must be read from file, rather than a constant. The same is true of other elements used to express binary queries; namely, "<offset>", "<repeat>" and "<compareTo>". For this reason, all four elements can have separate function-query-constant trees descending from them (they all have type "inputType"). "<range>" nodes can have "<func>" children. Thus "binQueryType" "<query>" elements have the unique feature that further "<query>" elements can be descendants to any depth, and there are many ways in which this can occur.

In some embodiments, each "<range>" element has "<start>" and "<end>" children to delimit the start and end of a byte sequence or bit sequence that is to be read, and these delimiter elements can be interspersed with any number of "<skip>" elements to indicate ranges that are skipped over, not read. "<start>", "<end>" and "<skip>" elements are all of type "delimiterType", and allows specification of a stream position by any of the following kinds of operations, in the following order:

1. Match based on stream content. The details depend on the inherited sub-type of "delimiterType":

"compareDelimiterType" to match based on numerical equality or inequality. The comparison is with a "<compareTo>" child, which is of type "inputType", and the nature of the comparison is given by the attribute "relation". The compared stream content is of size given by the attribute "size", and the address is incremented by an amount given by the attribute "interval" after each unsuccessful comparison. The start of the first successful comparison is the matched address.

"regExpDelimiterType" to do string matching using a regular expression. The "regExp" attribute provides a regular expression in the syntax of "translation.xsd", the "encoding" attribute determines how byte sequences are to be interpreted as strings, and the "matchedChar" attribute determines whether the matched address is that of the first or last character of the matching content.

2. Apply an offset to the address with an "<offset>" child element, which is of type "inputType".

3. Align to the next nearest absolute address that is the specific multiple of bytes or bits given by the "align" attribute value.

4. Repeat the above operations a number of times given by the "<repeat>" child element, which is of type "inputType", culminating with the actual delimiter position at the end of the last operation.

"delimiterType" elements also share the following attributes that determine the meaning of numerical address values:

"bitsPerUnit" provides the number of bits per address increment assumed for the "<offset>", "align", "size" and "interval" data; e.g. set "bitsPerUnit='1'" for bit counts, or "bitsPerUnit='8'" for byte counts "ref" determines whether the delimiter definition is "absolute", "relative" or "current", where the meaning of these terms is analogous to their meaning in the XPath specification. Absolute addresses are file stream positions starting at zero, relative addresses are the amount that has to be added to the prior delimiter element's position (among previous sibling or ancestor "<range>" elements within a common "<query>" subtree), and current addresses are the amount that has to be added to the current context position, determined by the nearest-ancestor "<query>" element.

These attributes were chosen to accommodate the typical forms of binary file format data access needed by a parser. Binary data access has been modeled as a set of pointers into the file stream, making it easier to generate code that stores pointers, then fetches the data only when it is needed, and without needlessly making intermediate copies of the data.

In some embodiments, a mapper translator is generated in 406. In some embodiments, the source of the mapper translator is output of a parser translator, and the output is queried with the "xpathQueryType" of "<query>" element. In some embodiments, even though the queries of in-memory objects and not serialized XML, the "xpathQueryType" is used to specify the queries since it is convenient to describe object queries in terms of queries on the prescribed XML serialization of the objects, even the serialization is not performed. The "xpathQueryType" of "<query>" element has a required "xpath" attribute that encodes its data as a standard XPath. The XPath is interpreted as acting on the source object model, where objects are interpreted as nodes and member objects are interpreted as child nodes. The context for the XPath is set by the code generated from the mapper pattern, starting with a context node assignable to each mapper pattern object. XPath expressions that return node sets are normally turned into code that returns arrays as defined in the target language of the code generator.

In some embodiments, a serializer translator is generated in 406. In some embodiments, the serializer is implemented via an interface implemented by each of the objects in the mapper target format. This is optimized so that each mapper target object serializes itself as soon as all its information has been read in from the parser's target object tree. In some embodiments, serialization is used for test purposes during development. For example, the parser and mapper target objects implement the serialization interface in debug builds. Control flow usually begins at the root of the mapper target object tree. In the case of a translator that serializes its output, control begins with a call to the root object's "write" member function. As with other objects in the target object tree, this will trigger calls into the parser target object tree to access its member data, which will be written out, interspersed with calls to the "write" functions of child objects (which are created as needed). When parser target objects are queried, they will read their data in, create any other objects on which they depend (if not already created), and query any other objects on which they depend. Generally, dependence happens along lines of ancestry.

In some embodiments, generating the translator includes generating code that can be compiled to the translator. In some embodiments, the code is C++ code. The code generator uses XML written in the grammar of "translation.xsd" and performs a templating function derived by the input XML. In some embodiments, XSLT is used to produce the C++ code. In some embodiments, a translator consists of general code infrastructure into which specific, generated code components plug in. The general code takes the form of a set of libraries that are statically linked, and is needed to look after things like setting context variables, managing input and output streams, and managing information that permits streaming, progressive rendering and memory use optimizations. The specific code components plug in by inheriting from library base classes and implementing library interfaces. These interfaces include handlers for the various parsing, mapping and serializing tasks, and they provide access to runtime variables affecting the specific code. In some embodiments, there exists "default" code-generators associated with master XSLT files that are imported into each individual pattern's XSLT file, and whose individual code-generating templates can be overridden. The default code-generators generate C++ classes and member variables with naming and membership corresponding to the translation pattern's object model, and they will provide a generic treatment for function-query-constant trees. Pattern-specific overrides can, for example, create a target object model different from the pattern object model and can add member functions specific to each object. In some embodiments, parser pattern overrides tend to leave the default target object model code generation in place (but will change other things), whereas mapper pattern overrides tend to replace the default with code generation for target objects that is unique to each pattern. This reflects the assertion that a parser's job is to faithfully construct an in-memory object representation of the input information without fundamentally changing or re-interpreting that information, whereas a mapper's job is to apply whatever re-interpretation is necessary to optimally map to target format constructs.

At 408, the generated translator is verified. In some embodiments, verifying the translator includes translating a test file and examining the output. In some embodiments, examining the output includes presenting the output and/or a representation thereof to a user and receiving feedback from the user. If the output is not (entirely) valid, one or more translations patterns and/or parameters are modified (e.g., as specified or otherwise indicated by a user), and the translator is regenerated with the modifications. In some embodiments, regenerating the translator with modifications includes repeating 402-406, as applicable. The verification and regeneration is performed until the translator is valid. In some embodiments, the verification and modification is at least in part performed using a graphical interface tool. In some embodiments, the verification is optional.

An object-oriented library is the implementation of a collection of classes. Classes have properties and methods. The properties may be primitive objects (such as integers or characters), instances of other objects in the collection, or collections of objects. Specific details vary, based on programming language constructs, support for reflection (which permits run-time inspection of arbitrary classes), and/or supported dispatch mechanisms. In some embodiments, automated access to computer documents is often provided through an object-oriented software library whose classes and methods provide access to everything in the document. The interface exposed by this library is the "Application Programming Interface" (API). In some embodiments, the API is "fully-abstract", projecting all the information that is required by the consuming application but not providing any additional information. For example, for a format that links together blocks of characters, the API might simply provide access to the characters in order, without exposing the linking mechanism at all. Such abstraction mechanisms are pervasive because they are crucial to the management of complexity in the development of real-world software.

As used herein, an abstraction is a projection or function from one domain to another. An API implements a projection (of the binary data in a document to the data types it provides). In some embodiments, the projected view is associated with a tree structure. In some embodiments, document APIs are used for purposes, such as mapping one format to another, providing searching and indexing capabilities, and/or rendering the elements visually. Real-world document API can be complex and developing software that uses them can be time-consuming and costly. A document query includes extracting specific kinds of data from a content (e.g., document) using the API. In some embodiments, the time it takes to develop software that uses the API can be reduced by using a language that specifies one or more queries for automatically generating program code.

For our purposes, we define an "element" to be an object with a name and a (possibly empty) set of attributes. An "attribute" is an object with a name and a value that is a primitive object, such as an integer, a real number, a character, or a string. A "tree" is a set of elements E together with a partial ordering $<$ of E such that, for each e in E, $\{f \text{ in } E | f < e\}$ is well ordered. This set of elements is called the "ancestors" of e. The ordinality of the ancestors is called the "height" of e. The "descendants" of an element e are $\{f \text{ in } E | e < f\}$. If e is an element with height k, the "children" of e are the set of elements f whose height is k+1 and such that e<f. e is called the "parent" of each f in the set. If the set is empty, then e is called a "leaf". The "siblings" of an element e are all the elements whose parent is the parent of e. An "ordered tree" is a tree which has exactly one element of height 0, called the "root" of the tree, and which has an element ordering that is defined between the children of any element in the tree. A "tree schema" is a set of constraints over trees from which it is possible to define a predicate valid(t). All the elements of an ordered tree can be well-ordered in a sequence $E_1$, $E_2$, $E_3$, ..., $E_N$, as follows:

$E_1$ is defined as the root

If $E_k$ is a leaf, then

If $E_k$ has a next sibling, then $E_{k+1}$ is defined as the next sibling

Otherwise if $E_k$ has an ancestor with a next sibling, then $E_{k+1}$ is defined as the next sibling after the closest ancestor that has one Otherwise $E_k$ is the last element in the sequence Otherwise $E_{k+1}$ is defined as the first child of $E_k$ The ordering of elements above is called "document order". For example, when an ordered tree is serialized as XML, element start tags are written out in document order.

In some embodiments, schemas are defined by providing a set of element names, a set of attributes for each element, and various constraints of the possible descendants of each element. Trees can support linked and cyclic structures through the use of reference attributes. In an object-oriented programming language such as C++, trees are commonly implemented using a Composite pattern. Each element type is defined by a class with a common base class. The base class provides a container for the children. The element's attributes are defined by properties of the class. This implementation allows trees to be constructed and traversed, from the root to a specific element. Implementations of trees do not always provide a means of traversing down the tree, or to a sibling node (these trees grow from the root downwards). A reference is an expression that uniquely identifies an element in a tree. There are various possible ways to express references. For example, a finite sequence of numbers (assuming directed trees) can be used, where an empty sequence designates the root of the tree, otherwise the first number designates the child of the root, the second number the index of its child. The number −1 designates a parent. Using this language, a reference to any node in a tree from a given node can be specified.

In some embodiments, a query takes a tree and returns data. A query can return one or more of the following: a primitive value, an element from the tree, and an ordered set of elements. A query is an expression that defines an attribute, element or set of elements for a given tree, given a specific element (the starting position of the query). References augmented by a period (.) and a name for attributes, and special operators such as "descendants" and "ancestors" can be used to define a query language. In the XML query language XPath, these operators are called axis specifiers. A filter may be added to a query, where a filter is a predicate that can determine whether or not to include a node or attribute in the query result. A "step" is a triplet "<a,n,F>" where a is an axis specifier, n is a node-test, and F is a (possibly empty) set of filter tests. A "query" is a pair "<a,S>" where a is either absolute or relative, and S is a sequence of steps. Intuitively, absolute queries start from the root of a tree, while relative queries start from some given position in the tree. The notation "P.t" is used to indicate a query made up of a sequence P of steps, and a single step t. P is called the "prefix" of the query. The example above is not dependant on any particular realization of a tree-based or xml-based query language. The XPath language is a widely used example of a query language, and all queries as defined here can be expressed using XPath syntax.

In some embodiments, the code generated by a given translation pattern executes in an order unique to that pattern. Normally, this means that the document order of the "<param>" elements in the pattern's parameterized object model is the order in which these parameters are read in, and each element of the target object model is created as soon as all the information needed to produce it has been read in. When information is available for creating multiple output objects simultaneously, the output objects are created in output object model document order. When serialization of the output object model is needed or desired, the elements are serialized in a separate thread, in document order up to the last element whose existence, name and attributes are known to be complete. This method ensures that information is streamed out as soon as possible, which permits the progressive display of information by an application during the translation process.

The following is an example of the order of execution of code associated with one "<param>" element's specification: Its function-query-constant tree is traversed in document order. When a "<const>" is encountered, the specified constant is just instantiated and assigned in memory. When a "<func>" is encountered, the corresponding function is called in a function library linked to the generated code. When a "<query>" is encountered, that query is executed according to the methods described later in this document.

Some objects in the parameterized object model for a given pattern have parameters, and others do not. The ones without parameters are represented by a reference to another pattern instance or the same pattern instance, as in the following example:

```
<?xml version="1.0" encoding="UTF-8"?>
<translation xmlns="http://www.schemasoft.com/schema/translation.xsd"
  xmlns:xsi="http://www.w3.org/2001/XMLSchema-instance"
  xsi:schemaLocation="http://www.schemasoft.com/schema/translation.xsd
  translation.xsd" uri="http://www.schemasoft.com/translations/headers">
  <object name="list" id="sections">
    <param name="for">
      <query xsi:type="xpathQueryType" xpath="./section"
        type="nodeset"/>
    </param>
    <object name="section">
      <param name="title">
        <query xsi:type="xpathQueryType" xpath="./title/text( )"
          type="string"/>
      </param>
```

-continued

```
      <object name="content" href="./content.xml"/>
      <object name="list" href="#sections"/>
    </object>
  </object>
</translation>
```

The "content" object references a pattern instance in another file "content.xml" by relative URL, and the "list" object that follows it references the outermost list object in the same file. The following is how to generate code that implements these references. The code generated from any translation pattern instance includes the definition and instantiation of a class with a "translate( )" method. That class inherits from a base class with a default "translate( )" implementation. When a translation pattern instance includes an object reference, this generates a call to the "translate( )" method of the referenced object. The whole translation process is begun by a call to the "translate( )" method of the root object of one of the translation pattern instances specially designated as the root translation pattern instance. This triggers a cascade of calls to the "translate( )" methods of all the referenced objects. The base class "translate( )" takes an argument which is a pointer to a node in the output object tree. This allows each object's translator to tell its sub-object translators where to begin generating output. The "translate( )" method can be overridden to pass additional information needed for navigation purposes by sub-objects.

In some embodiments, an efficient method is used to create and serialize target objects. The base class for each target object in the target object tree has a state variable that takes one of the following values; for example, as an enumeration in C++:

enum {notWritable, writable, lastWritable, written, lastWritten};

Similarly, it has another state variable that takes one of the following values:

enum {incomplete, complete, disposable};

The values are interpreted as follows:
"notWritable"—The name and attributes of this element are not ready to be written out.
"writable"—The name and attributes of this element are ready to be written out (although it is not necessarily true that all its children are writable).
"lastWritable"—The last element in document order that is writable (but not yet written).
"written"—Written to file
"lastWritten"—The last element in document order that has been written to file
"incomplete"—Not all the children of this element have been created.
"complete"—All the children of this element have been created (although some of them may themselves be incomplete).
"disposable"—Ready to be purged from memory due to the fact that this node has already been written to file and its data is not needed for further reference.

In some embodiments, the state values can only be changed from one state to a subsequent state in each of the enumerations, with the exception that "lastWritable" can revert to "writable" and "lastWritten" can revert to "written" as these tree pointers move forward in document order. In some embodiments, it is possible to skip states. These state variables are used to make the creation and serialization of the target tree more efficient.

In some embodiments, target objects can be re-used. In some embodiments, functions given in function-query-constant trees can be methods on objects in the target object model. If data computed by one generated code fragment is needed by another generated code fragment, then the first code fragment can store it in the target object tree, and the second code fragment can access the data there. This avoids unnecessary re-computing of results. Even if the re-used data is just an intermediate result and is not to be serialized, it can be stored in the target object tree with serialization methods that do nothing. Another option is to create custom objects just for the purpose of storing intermediate results, and to access their methods in pattern instances. When accessing target objects in this manner, the writable state is used to determine whether the object's name and attributes can be accessed, and the completeness state is used to determine whether an object's children can be accessed. The generated code can do lazy querying of the source document, only actually implementing the queries that are used to fill out the target objects when the information is needed.

In some embodiments, output content is written as a stream. The states can be used to determine how much of the tree can be safely serialized without backtracking in the output stream, even though the tree could be built in memory in any order. The serializable portion can be efficiently updated just by checking the states of neighboring elements, rather than having to traverse the whole tree every time there is a change. When generated code determines that a "notWritable" element's name and attributes are ready to be written out, it calls a "writable( )" method that does the following: If the previous element in document order is "complete" or "disposable" and "lastWritable", "written" or "lastWritten"; or if there is no previous element (because the current element is the root), then the current element is changed to "lastWritable" (and if the previous element was "lastWritable" it is changed to "writable"); otherwise the current element is changed to "writable." Furthermore, when generated code determines that an "incomplete" element is now "complete," it calls a "complete( )" method that changes the state to "complete" and, if that element is also "lastWritable", "written" or "lastWritten" then iterates forward in document order and calls "writable( )" on each element until encountering the first element that is not "writable." This has the effect of moving the "lastWritable" position forward as far as it can go. A separate thread can actually do the writing at any time from the "lastWritten" element to the "lastWritable" element (when one exists) or a "write( )" method can be called every time the state of an element changes to "lastWritable." The "write( )" method writes an element's start tag and attributes after closing any needed end tags, then changes the element's state to "written", unless the element before it in document order is "lastWritten"; in which case it changes the element's state to "lastWritten" and the previous element's state to "written."

In some embodiments, memory can be opportunistically purged. In some embodiments, target elements are marked as disposable when they have been written and they are no longer going to be accessed. In the case of a memory exception or internally-imposed limit, any subtrees that are entirely disposable can be deleted to free up memory.

Figure 5:
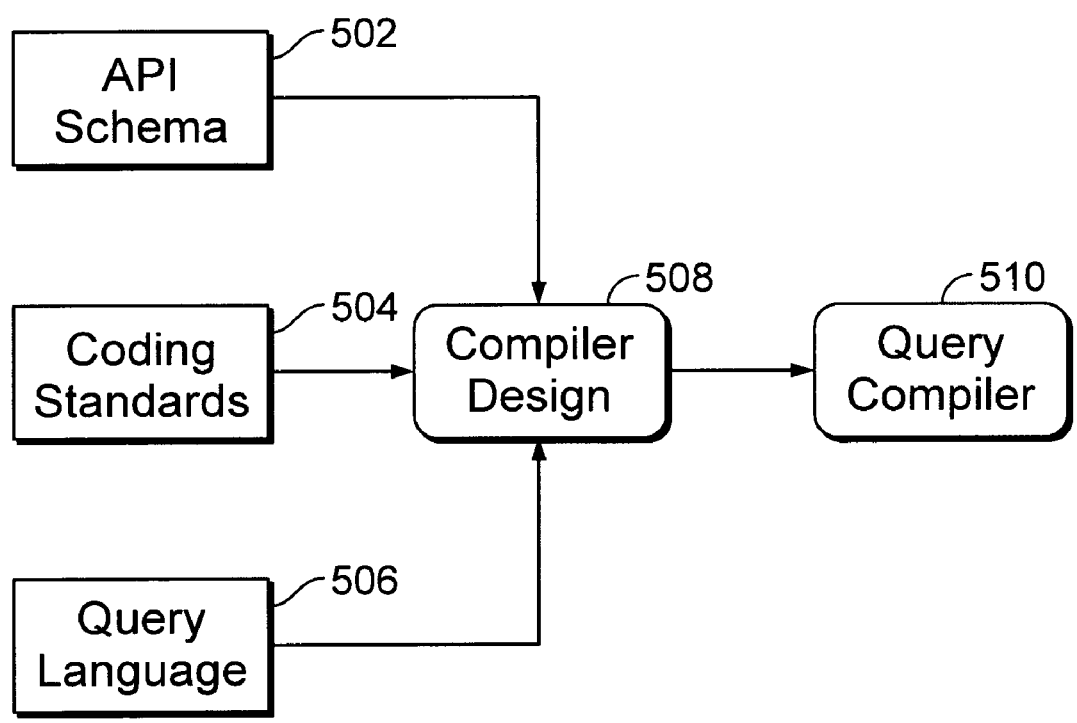
FIG. 5 is a diagram illustrating an embodiment of a process for generating a query compiler.

FIG. 5 is a diagram illustrating an embodiment of a process for generating a query compiler. API schema 502, coding standards 504, and query language 506 are inputs to compiler design 508. In some embodiments, API schema 502 is associated with source content schema. In some embodiments, API schema 502 includes a view of instances of source content as ordered trees. Schemas are often large documents, because document formats typically include hundreds of distinct elements, with complex inter-relationships. In some embodiments, all of these relationships are documented in the schema. Coding standards 504 includes two parts. The first part is associated with general conventions that are typically industry-wide or company wide standards, including items such as use of comments and tabulation, and/or variable naming conventions. In some embodiments, by embedding this information into the compiler, application developers are relieved from a significant amount of overhead. In some embodiments, query language 506 is associated with a query-language parser embedded in query compiler 510. In some embodiments, documentation of the document API is an input to compiler design 508. In some cases, a query can be compiled to code that follows the schema, but in other cases, there may be many instances where the correct code for a particular pattern cannot be generated by looking only at the schema. In some embodiments, the compiler design takes these exceptions into account. Compiler design 508 is at least in part used to produce query complier 510.

Figure 6:
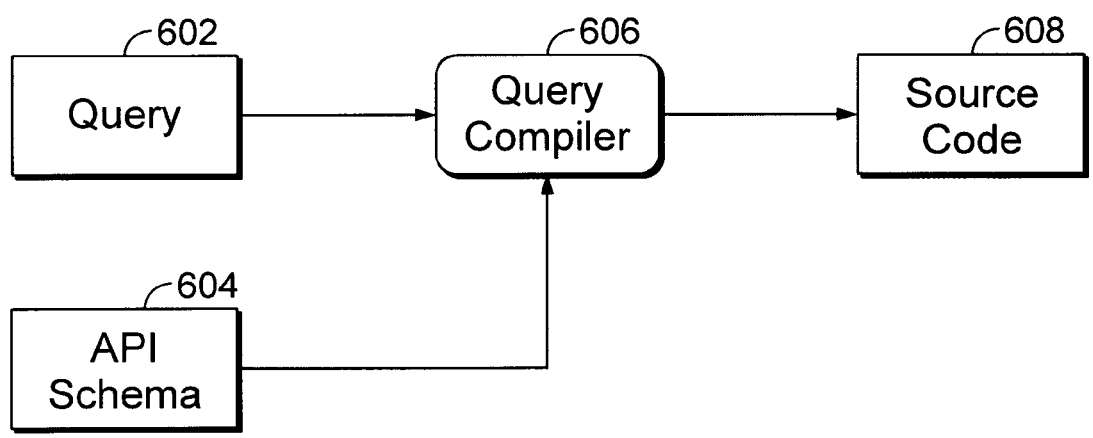
FIG. 6 is a diagram illustrating an embodiment of a process for using a query compiler.

FIG. 6 is a diagram illustrating an embodiment of a process for using a query compiler. In some embodiments, query compiler 606 is query compiler 508 of FIG. 5. Query compiler 606 is a Query compiler for a given document API. Query 602 and API Schema 604 are at least in part used by query compiler 606 to generate source code 608. In some embodiments, the compiler target language is C++.

Figure 7:
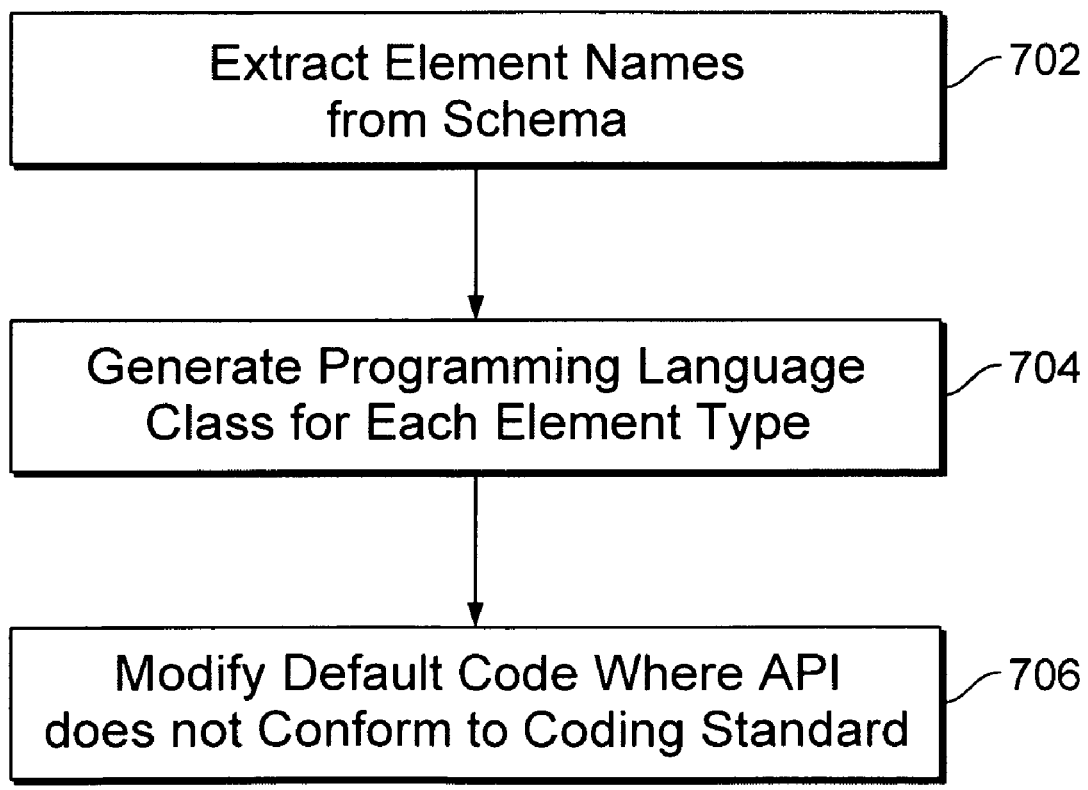
FIG. 7 is a flow chart illustrating an embodiment of a process for generating a query compiler.

FIG. 7 is a flow chart illustrating an embodiment of a process for generating a query compiler. In some embodiments, the generated query compiler is 510 of FIG. 5 and/or query compiler 608 of FIG. 6. The query compiler is a software component that translates a query into (target) computer code. The target code, when executed, extracts data from source content. A document API, a schema, and a coding standard is used in generating the query compiler. A document API is a software library and its accompanying header files. A schema is a comprehensive description of the elements and attributes of the underlying source format, with the relationships between them. A coding standard includes one or more rules for using the API from software code. At 702, element names are extracted from the schema. At 704, a programming language class (e.g., C++ class) is generated for each element type using the coding standard. At 706, a default code is modified where the API does not conform to the coding standard. In some embodiments, the modification of 706 is performed manually by a programmer.

In some embodiments, standards for code included in the generated source codes includes one or more of the following standards:

1. If an element in the schema has name N, there is a class in the API with the same name.
2. If an element in the schema has name N, and an attribute a of type t, then the class contains these methods:
   t getA(void);
   void setA(t in_value);
3. If an element has a child named E then the class contains this method:
   E* getE(void);
4. If an element has collections of children, then it has iterators over the elements with a particular name.
   Iterator* elementIteratorName( );

5. The base class for all classes in the API includes these two methods:
   int numberOfChildren( );
   Object* getChild(int i);
6. Given an object, there is a method with signature
   bool isInstanceOf(const char* name);

which returns true if the element name is equal to the name parameter.

In some embodiments, a special variable called currentNode is assumed to be a reference to a node in a tree. In some embodiments, a collection of variables called attributeValueT is set to the result of an attribute query, where T is the type of the attribute value. In some embodiments, given a query and the schema, the compiler can determine the kind of query, where the kind can be attribute, element or sequence of elements. If Q is a query, we write kind(Q) to indicate the kind of the query.

In some embodiments, a query is a sequence of steps, each step is a triplet, and the query's kind can be determined. For example, queries can be written as P.s where P is a (possibly empty) sequence of steps, and s is a step. In some embodiments, the generated code can be fully determined by the schema and the coding standards.

The generic query compiler has a class for every possible node-test. These classes all inherit from a base class that provides a standard "compileQuery" method. The compiler starts by examining the step "<a,n,F>". Using a factory, an instance of the class corresponding to n is created. Its compileQuery method is then called, passing the entire query. In some embodiments, this method allows the subclass method to by-pass the normal code generation pattern if necessary.

A standard way to implement the compiler is to provide a class with generic methods for each of the cases described below. For example, a method of this class is:

```
GenericComplier::CompileStringAttribute(const char* name)
{
    char buffer[2000];
    sprintf(buffer,
        "attributeValueString = currentNode.get%s\n",
        name);
    code->output(buffer);
}
```

In some embodiments, the target code is built using a collection of code classes rather than by writing strings. The methods for particular classes can simply call the generic compiler if they are standard. For example, if there is an element named E with string attribute, the class for E in the compiler is as follows:

```
class E
{
    ...
    compileAttribute(const char* name)
    {
        genericCompiler-> CompileStringAttribute(name);
    }
    ...
}
```

In some embodiments, this design makes it straight-forward to deal with cases that do not follow the standard templates.

The following is an example of compiling element node tests. When the node test is a simple element name, there are three code patterns, one for each kind of query. In the case where the kind is not sequence, the query specifies a single value accessed from a single element in the source tree. Prefix of the query must be of kind element. Whenever code is generated for an element, the variable "currentNode" will be set to the appropriate node. The following is an example of the three code patterns.

Kind attribute—Assume: T=String, attribute name=Attr. kind(Prefix)=element.
CODE FOR Prefix P followed by:
attributeValueString=currentNode.getAttr( );
Kind element—Assume: Node test is Elt. kind(Prefix)=element.
CODE FOR Prefix P followed by:
currentNode=currentNode.getElt( );
Kind sequence—In this case, instead of returning all the elements that satisfy the node test, the compiler creates an iterator. The kind of the prefix also determines the output code pattern. If kind(P)=element, then the generated code obtains an iterator for the node-test using
currentNode->elementIteratorN where "N" is the element name of the last step. If kind(P)= sequence, the parent itself is a collection of nodes, and will provide an iterator. This iterator will be part of the state of the generated iterator. The base class for iterators is:

```
class Iterator
{
    private:
        Iterator* elementIterator; // nill if kind(parent)=element
        Iterator* parentIterator;
        char* nodeTest;
    public:
        Iterator(Iterator* parent,const char* nodeTest,
                Element* currentNode);
        Element* nextElement( );
};
Iterator::Iterator(Iterator* parentIterator,const char* nodeTest, Element* currentNode)
{
    this->parentIterator = parentIterator;
    this->nodeTest = nodeTest;
    if(this->parentIterator)
    {
        Element* parentElement =
            this->parentIterator->nextObject( );
        elementIterator =
            parentElement->elementIterator(nodeTest);
    }
    else
    {
        elementIterator =
            currentNode->elementIterator(nodeTest);
    }
}
Element* nextElement( )
{
    Element* result = elementIterator->nextObject( );
    if(result) return result;
    Element* parentElement;
    if(parentIterator)
    {
        parentElement =
            parentIterator->nextElement( );
        if(!parentElement) return nil;
    }
    elementIterator =
        new parentElement->elementIterator(nodeTest);
    return elementIterator->nextObject( );
}
```

The constructor and nextElement can be overwritten to take advantage of the existence of a specific iterator method in the parent object that provides an iterator for children with the given name. There are slightly different patterns for kind(P)= sequence and kind(P)=element. Thus the generated iterator for a node test whose element name is Elt will be:

```
Case 1: kind(P) = element, element name of parents node's last step: N
    class Elt: public Iterator
    {
    public:
        Elt (Iterator* parent)
        {
            this->parentIterator = NULL;
            this->nodeTest = "Elt";
            elementIterator =
                currentNode->elementIteratorN( );
        }
        Element* nextElement( )
        {
            Element* result = elementIterator->nextObject( );
            return result;
        }
    };
Case 2: kind(P) = sequence, element name of parents node's last step: N
    class Elt: public Iterator
    {
      public:
        Elt(Iterator* parent):super(parent,"Elt",NULL){ }
        Element* nextElement( )
        {
          Element* result = elementIterator->nextObject( );
          if(result) return result;
          Element* parentElement;
          parentElement = parentIterator->nextElement( );
          if(!parentElement) return nil;
          elementIterator = new parentElement->elementIteratorN( );
          return elementIterator->nextObject( );
        }
    };
```

The following is an example of compiling code for filters. A step that contains a sequence of filters is of kind sequence. An iterator is generated for each filter. There are two types of filters: a literal index (a positive integer) and an expression. The code generated for expressions is a copy of the filter, except that any embedded query is compiled first. In the special case of node( ).attr, the generated expression is currentNode->getAttr( ). The iterator for a filter F where EXPRESSION(F) indicates the expression corresponding to the filter is:

```
class Filter: public Iterator
{
  public:
    Filter(Iterator* parent):super(parent,NULL,NULL){ }
    Element* nextElement( )
    {
        Element* result;
        while(result = elementIterator->nextObject( )
              && EXPRESSION(F));
        return result;
    }
};
```

In the case of an index filter (N), the iterator is:

```
class Filter: public Iterator
{
```

```
    public:
        Filter(Iterator* parent):super(parent,NULL,NULL){ }
        Element* nextElement( )
        {
            count = 0;
            Element* result;
            while(result = elementIterator->nextObject( )
                  && count++<N);
            return result;
        }
    };
```

In some embodiments, there exists an object identified as "document" with a method named "root" that returns the root element of the document. For the example query:

/A/B/C[node( ).foo=6][2]

where kind(/A)=element, kind(/A/B)=sequence and kind(/A/B/C)=sequence. The generated code following the above patterns will be:

```
currentNode = document->root( ); // /a
Ib bs = new Ib(NULL,"b",currentNode);
Ic cs = new Ic(bs,"c",NULL);
If fs = new If(cs,NULL,NULL);
C* elt = NULL;
int i = 0;
while(i<1 && elt = cs->nextObject( ));
if(i==1)
{
    currentNode = elt;
}
// Precondition: currentNode is NULL or points to
// correct node in tree
```

Although it is always possible to compile code for arbitrary queries, the compiler may constrain the queries allowed to avoid generating inefficient code. For example, if the API does not provide a "getParent" operator, then queries such as <ancestor,elt,nil> may be rejected. Axes such as "*" and "descendant" generate iterators in much the same way as the iterators described above.

In some embodiments, a real-world API has partial compliance to the coding standards implied by the assumption stated above. A general method for extending the code generator described above so that it can generate code that works for any document API is disclosed. The document schema is independent of any particular coding standard. The purpose of the schema is to provide developers with a uniform and consistent view of the data in documents. This can be thought of as a "virtual" API for the document. The actual API may be designed with particular design criteria that are not directly compatible with the schema. Examples include attributes that can be inferred but are not provided directly (which we call synthetic attributes), mechanisms for navigating through the document which do not follow the straight-forward tree traversal methods implied by the schema, and performance requirements satisfied either by providing methods and classes that are not part of the schema, or by placing constraints on API calls. Traditionally it was up to developers to determine from the API documentation (and perhaps by trial-and-error) how to use the API to effect particular queries. The query compiler represents an encapsulation of this knowledge in a useful form.

In some embodiments, the generic code generator uses a distinct class for each node test, and the code generation methods for each node test are independent. The code generator is presented with the entire query before the query prefix is used to generate code. The code generator for a particular node test can control the overall code pattern. For example, the code generator for a particular element E could even use a pattern different from the prefix P that it is given. These two points allow the code generator to emit code patterns that vary widely from the generic patterns. The following are examples.

Access to text: Conceptually, a body of text can be considered to be the value of an attribute of an element. In practise, text is usually treated differently, mainly because the size of text objects may be large. The node-test in XPath for text is "text( )". The generic compiler generates elt->getText( ), but the document specific compiler will generate code which is consistent with the API's requirement for accessing text.

Synthetic Attributes: A synthetic attribute is defined in the API documentation as an attribute that is not present, but whose value can be computed. An example arises from a common pattern in the PowerPoint schema where the siblings of an element are grouped using a marker element. For example, all the text for a presentation is stored in a section of the document whose element is called "slideListWithText". For each slide in the presentation, there is a sequence of elements in the children of slideListWithText such as slidePersistAtom, textHeaderAtom, textBytesAtom, textInfoAtom There is no actual attribute of "slideListWithText" that provides the number of slides, but we can easily compute this value, for example by counting the children whose name is "slidePersistAtom". Since this value is useful to developers, it can be provided in the document schema as a synthesized attribute. The compiler class for "slidePersistAtom" will generate the following code for accessing the attribute:

```
int tmp=0;
PPTElement* obj;
while(obj=currentNode->getNextSlidePersistAtom( ))
    tmp++;
attributeValueInt=tmp;
```

There is no restriction on form of the compiled code. A syntehesize attribute may involve complex computation, and extensive navigation of the document, but by using the query compiler, we effectively gain reuse of the methods required by the particular API to access the synthetic attribute.

Streaming Access: Generally, there are two models for accessing documents, which we will call the DOM approach and the Streaming approach. In the DOM approach, the API provides a method (or small collection of methods) that effectively builds an entire tree structure for the document in internal memory. Once this call returns, the program need make no further access to an external memory device when accessing parts of the document. It is generally a property of this model that the time taken to access to any property of the document is only dependent on the properties height in the tree. (For example, it takes the same time to access the first and last child of the root of the tree.)

In the Streaming approach, the API provides methods for accessing the document one part at a time. In some instances, the order in which the parts are delivered corresponds to the order in which they appear in the documents external file. However, even if the order in which the parts are delivered is different from the file layout, a streaming interface can be prefereable to a DOM interface because it requires less memory than a DOM approach. This is especially important in processing large documents. Complex APIs may permit both streaming and DOM approaches, but overall design considerations might determine which approach is used. We will illustrate the generality of the query compiler with an another example from Microsoft's PowerPoint. Consider the XPATH expression /powerPointDocument/ehsRoot[1]/document[1]/
slideListeWithText[2]
/textBytesAtom/text/text( )

which is a real-world example for this format. When evaluated, this expression should return the set of text blocks for every slide in the presentation (which might be used, for example, by an indexing program). Note that the XPATH kind is sequence, because the steps "textByteAtom" and "text" are not filtered. The compiler method for compiling the element "text" will do the following:

1. Check that the prefix query is valid, and that it is equivalent to

//slideListWithText[2]/textBytesAtom (if not, generic code will be emited).
2. Generate stream based code for the nextObject method of the iterator:

```
class text: public Iterator
{
    private:
        PttTextObject* textObject;
    public:
    text::text( ):super(NULL,NULL,NULL)
    {
        textObject = PptFactory::factory(PPTTEXTATTOMID);
    }
    PptObject* nextObject( )
    {
        pptReader->read(&object);
        return *object;
    }
};
```

The iterator relies on a design pattern in the API: the so-called reader works by looking for the next object in the document (from its current location) that corresponds to the type of argument it is passed. The methods "seek" and "read" are similar—the difference is that "seek" does not populate its argument, it simply positions the internal read position of the reader. (Node that the API uses polymorphism rather than introspection to implement the read methods. In other words, there is a family of read methods, one for every object type. This allows the API's implementation to optimize access on an element-by-element basis.)

In this example, because the factory method created a PptTextObject, each call to the reader's read method will return the next "text" object. The compiler can make use of the knowledge that, although the "text" elements are children of the second occurrence of slideListWithText, no descendants of the first instance have an element named text. In other words, the compiler methods can produce code that takes advantage of specific information that may not be part of the schema. Note further that the only use made of the Prefix in this case is to check that it is valid. No code is generated for the Prefix.

Aggregated Schemas: Many real-world document formats are an amalgamation of distinct schemas. Furthermore, it is even possible that the coding standards differ for distinct parts of the schema. The implication of this is that access to elements is not uniform, usually dealt with by developers using "if" tests in their code. However, our invention solves this problem by permitting the code of each iterator to overide the generic iterator code. For example, consider an XPath query like

/A/B/C . . .

and suppose that the API call required to access A's children named B is different from the call required to access B's children called C. Because we generate different iterators for A and B, there is no problem generating the different calls in the "nextObject" method of the iterator. Each iterator class must inherit from the same base class, because this is how they interconnect, but the code for accessing particular child elements can differ.

As an example, consider "Escher", a schema used for representing graphical objects that is used in the entire family of Microsoft Office products. The Schemas for the individual formats (Excel, Word, Powerpoint), differ substantially, but they all permit the embedding of Escher objects. The way that Escher is actually used differs in each case, so it is not possible to generate generic "Escher" code that works with all three formats. On the other hand, any library that provides a Microsoft Office API will provide a section that works with Escher that is likely to be common. The implication for developers is that access to children of an element in a document tree will differ for Escher elements and other elements. Our code generator accommodates these differences through the use of iterators as discussed above.

In some embodiments, XML can be used to describe various aspects of the methods described here. For example, schemas can be described using XML (XML-Schemas). Instances of documents can be expressed using XML. A document API can be used to create a tool that maps any document to its XML form, where the XML form is valid with respect to the schema. Developers can examine document structures as if they were XML documents, simplifying their task of deriving XPath expressions for query parameters. In some embodiments, one or more of the approaches described above offer at least two advantages. First, an approach described above is general, and can create target objects whose structure is significantly different than the source. Although this can be done with XSLT in some cases, the XSLT programs become very complex in these situations. Second, an approach described above is more efficient because translators are compiled rather than interpreted. The step of mapping to XML is not actually performed since the compiled queries use the API directly, and the code for extracting data from the source document is compiled. Since XSLT output is an XML file, there may be an additional step required to create a binary target file, whereas an approach described above permits such files to be created optimally.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of generating code, comprising:
receiving a specification of one or more translation patterns;
using at least one of the one or more translation patterns to generate using a processor at least a portion of a first code associated with a first translator, wherein the first translator is configured to create a target object model, including by populating one or more elements of the target object model in a processing order at least in part associated with an order of elements in at least one of the one or more translation patterns;
using at least one of the one or more translation patterns to generate at least a portion of a second code associated with a second translator; and
connecting together the first translator and the second translator to form at least a portion of a converter.

2. A method as recited in claim 1, wherein the order of elements includes a document order of an ordered tree representation of at least one of the translation patterns.

3. A method as recited in claim 1, wherein the order of elements is associated with an order in which elements of the one or more translation patterns are read.

4. A method as recited in claim 1, wherein each of the one or more elements of the target object model is populated when all information needed to populate the corresponding target object model element is read.

5. A method as recited in claim 1, wherein receiving the specification of the one or more translation patterns includes selecting one or more patterns from a library of previously created translation patterns.

6. A method as recited in claim 1, wherein receiving the specification of the one or more translation patterns includes specifying an instance of one or more of the translation patterns by providing at least a portion of information in the translation patterns.

7. A method as recited in claim 6, further comprising filling in one or more parameters of the translation patterns to specify the instance of the corresponding translation pattern.

8. A method as recited in claim 6, wherein each of the translation patterns is associated with a code generator that generates code at least in part by using the provided portion of information.

9. A method as recited in claim 1, wherein the parameters of the translation patterns are filled in using a language that includes constructs to specify one or more of the following: a constant value, a way of querying or otherwise obtaining data associated with the source content, and a way of processing constants and data associated with the source content.

10. A method as recited in claim 1, wherein receiving the specification of the one or more translation patterns includes generating at least one of the translation patterns.

11. A method as recited in claim 1, wherein a first translation pattern of the translation patterns references a second translation pattern of the translation patterns by a reference specified in the first translation pattern.

12. A method as recited in claim 1, wherein each of the translation patterns includes a parameterized object model.

13. A method as recited in claim 1, wherein each of the one or more translation patterns is associated with a schema for the generated code.

14. A method as recited in claim 1, wherein at least one of the translation patterns is associated with a target format.

15. A method as recited in claim 1, wherein a portion of the code generated by each translation pattern includes an indicator that specifies a location in the target object model to be populated by the corresponding code portion.

16. A method as recited in claim 15, wherein a next target object model location to be populated by the code is determined at least in part by one or more of the following: a last populated location in the target object model, a source data, a state of the target object model, and a translation pattern corresponding to a currently executing portion of the code.

17. A method as recited in claim 1, wherein the target object model represents source content in a target format.

18. A method as recited in claim 1, wherein the target object model includes at least a portion of data comprising a source content of the target object model.

19. A method as recited in claim 1, wherein at least one element of the target object model is serialized before all elements of the target object model have been created.

20. A method as recited in claim 1, wherein a serialized element of the target object model is indicated as disposable before all elements of the target object model have been serialized.

21. A method as recited in claim 1, wherein an element of the target object model includes an indicator that indicates whether the element has been written to an output.

22. A method as recited in claim 1, wherein an element of the target object, model includes an indicator that indicates whether all children of the element have been created.

23. A method as recited in claim 1, wherein the target object model includes data accessed by a translator associated with another target object model.

24. A method as recited in claim 1, wherein the first code and the second code are compiled to generate at least a portion of the converter.

25. A method as recited in claim 1, wherein the one or more translation patterns is associated with a way to represent one or more sets of similar features from different source content formats.

26. A method as recited in claim 1, wherein the one more translation patterns is encoded in a meta-language.

27. A method as recited in claim 1, wherein the one more translation patterns is encoded in eXtensible Markup Language.

28. A method as recited in claim 1, wherein the first translator comprises one or more of the following: a parser, a mapper, and a serializer.

29. A method as recited in claim 1, wherein populating elements of the target object model includes creating the elements of the target object model.

30. A method as recited in claim 1, wherein at least one of the translation patterns is associated with an ordered tree representation.

31. A method as recited in claim 1, wherein each element type of the translation patterns is defined by a programming language class, and all of the programming language classes of the element types are associated with a common base class.

32. A method as recited in claim 1, further comprising verifying the first translator, wherein if the first translator is determined to be not valid, one or more modifications are made to one or more of the following: at least one of the translation patterns and the first code.

33. A method of generating code, comprising:
receiving a specification of one or more translation patterns; and
using the one or more translation patterns to generate using a processor at least a portion of code associated with a translator;
wherein if first translation pattern of the translation patterns references a second translation pattern of the translation patterns, the reference is reflected in the code associated with the translator at least in part as a programming language method call between a program object associated with the first translation pattern and a program object associated with the second translation pattern.

34. A method of generating code, comprising:
receiving a specification of one or more translation patterns; and
using the one or more translation patterns to generate using a processor at least a portion of a first code associated with a first translator, wherein the first code is generated at least in part by using a query compiler to generate a portion of the first code which portion is configured to obtain from a source content in a source format a data value to be used in determining one or more elements of a target object model that the first translator is configured at least in part to create;
using at least one of the one or more translation patterns to generate at least a portion of a second code associated with a second translator; and
connecting together the first translator and the second translator to form at least a portion of a converter.

35. A method as recited in claim 34, wherein the query compiler is associated with an Application Programming Interface.

36. A method as recited in claim 34, wherein the portion of the first code is based at least in part a query.

37. A method as recited in claim 36, wherein the query is an XPath query.

38. A method as recited in claim 34, wherein the query compiler is generated based at least in part on one or more of the following: a schema, a coding standard, a query language, and an Application Programming Interface.

39. A method as recited in claim 38, wherein the coding standard includes a specification associated one or more of the following: a comment, a tabulation, a variable naming convention, a naming convention for accessing and modifying attributes, a programming language method for creation or destruction of an instance, and a use of a standard pattern.

40. A method as recited in claim 34, wherein generating the query compiler includes extracting information from a schema including at least one of the following: an element name, an attribute name, an attribute allowed on an element, an element allowed as a child of an element, and a content model indicating a specific cardinality and ordering of a child of an element.

41. A method as recited in claim 34, wherein generating the query compiler includes generating a programming language class for an element type using a coding standard.

42. A method as recited in claim 34, wherein the query compiler adapts at least a portion of the first code generated by the query complier to an Application Programming Interface.

43. A system for generating code, comprising:
a processor configured to
receive a specification of one or more translation patterns,
use at least one of the one or more translation patterns to generate at least a portion of a first code associated with a first translator, wherein the first translator is configured to create a target object model, including by populating one or more elements of the target object model in a processing order at least in part associated with an order of elements in at least one of the one or more translation patterns,
use at least one of the one or more translation patterns to generate at least a portion of a second code associated with a second translator, and
connect together the first translator and the second translator to form at least a portion of a converter; and
a memory coupled with the processor, wherein the memory is configured to provide the processor with instructions.

44. A computer program product for generating code, the computer program product being embodied in a computer readable storage medium storing computer instructions for:

receiving a specification of one or more translation patterns;

using at least one of the one or more translation patterns to generate at least a portion of a first code associated with a first translator, wherein the first translator is configured to create a target object model, including by populating one or more elements of the target object model in a processing order at least in part associated with an order of elements in at least one of the one or more translation patterns;

using at least one of the one or more translation patterns to generate at least a portion of a second code associated with a second translator; and connecting together the first translator and the second translator to form at least a portion of a converter.

45. A computer program product as recited in claim 44, wherein the order of elements includes a document order of an ordered tree representation of at least one of the translation patterns.

46. A computer program product as recited in claim 44, wherein receiving the specification of the one or more translation patterns includes selecting one or more patterns from a library of previously created translation patterns.

47. A computer program product as recited in claim 44, wherein each element type of the translation patterns is defined by a programming language class, and all of the programming language classes of the element types are associated with a common base class.

* * * * *

UNITED STATES PATENT AND TRADEMARK OFFICE
CERTIFICATE OF CORRECTION

PATENT NO.        : 7,774,746 B2                                  Page 1 of 1
APPLICATION NO.   : 11/407559
DATED             : August 10, 2010
INVENTOR(S)       : Mansfield et al.

It is certified that error appears in the above-identified patent and that said Letters Patent is hereby corrected as shown below:

On the cover page, under (73) Assignee, please correct the Assignee "Apple, Inc." to
    --Apple Inc.--.

Signed and Sealed this

Twelfth Day of October, 2010

David J. Kappos
*Director of the United States Patent and Trademark Office*